US012635839B2

(12) United States Patent (10) Patent No.: US 12,635,839 B2
Woodrow et al. (45) Date of Patent: May 26, 2026

(54) ROBOTIC CLEANER HAVING SURFACE TYPE SENSOR

(71) Applicant: SHARKNINJA OPERATING LLC, Needham, MA (US)

(72) Inventors: Chad Woodrow, Needham, MA (US); Brendan C. Uchendu, Boston, MA (US); Christopher Pinheiro, East Walpole, MA (US)

(73) Assignee: SharkNinja Operating LLC, Needham, MA (US)

( * ) Notice: Subject to any disclaimer, the term of this patent is extended or adjusted under 35 U.S.C. 154(b) by 1003 days.

(21) Appl. No.: 17/345,654

(22) Filed: Jun. 11, 2021

(65) Prior Publication Data

US 2021/0386261 A1 Dec. 16, 2021

Related U.S. Application Data

(60) Provisional application No. 63/074,260, filed on Sep. 3, 2020, provisional application No. 63/038,425, filed on Jun. 12, 2020.

(51) Int. Cl.
*A47L 9/28* (2006.01)
*G01N 21/47* (2006.01)
*G01N 21/55* (2014.01)

(52) U.S. Cl.
CPC ........... *A47L 9/2826* (2013.01); *A47L 9/2889* (2013.01); *G01N 21/474* (2013.01); *G01N 21/55* (2013.01);

(Continued)

(58) Field of Classification Search
CPC .. A47L 9/2826; A47L 9/2889; A47L 2201/06; G01N 21/47; G01N 21/4738;

(Continued)

(56) References Cited

U.S. PATENT DOCUMENTS 4,703,240 A 10/1987 Yoshimoto et al.
4,953,253 A 9/1990 Fukuda et al.

(Continued)

FOREIGN PATENT DOCUMENTS

CN 1889882 A 1/2007
CN 2881746 Y 3/2007

(Continued)

OTHER PUBLICATIONS

Audiowell Electronics (GangZhou) Co., LTD., "Make intelligent cleaner more intelligent—Ultrasonic sensors dedicated to intelligent cleaner," Release Time: Apr. 2, 2013, (May 13, 2019); http://www.audiowell.com/en/news-detail.aspx?id=88; 2 pages.

(Continued)

*Primary Examiner* — Gordon J Stock, Jr.
(74) *Attorney, Agent, or Firm* — Secant IP PLLC

(57) ABSTRACT

A combination surface type sensor may include a housing including a first receptacle, a second receptacle, a third receptacle, and a fourth receptacle, a first surface type detector disposed within the first receptacle, a second surface type detector disposed within the fourth receptacle, an emitter disposed within the second receptacle, and a drop-off detector disposed within the third receptacle.

8 Claims, 7 Drawing Sheets

(52) U.S. Cl.
CPC .... *A47L 2201/06* (2013.01); *G01N 2021/556*
(2013.01)

(58) Field of Classification Search
CPC ...... G01N 21/474; G01N 21/55; G01N 21/57;
G01N 2021/4733; G01N 2021/4735;
G01N 2021/4752; G01N 2021/4754;
G01N 2021/4757; G01N 2021/4764;
G01N 2021/4771; G01N 2021/4773;
G01N 2021/4776; G01N 2021/4783;
G01N 2021/556; G01N 2021/559
See application file for complete search history.

(56) References Cited

U.S. PATENT DOCUMENTS

| | | | |
|---|---|---|---|
| 4,977,639 A | 12/1990 | Takahashi et al. | |
| 5,307,273 A | 4/1994 | Oh et al. | |
| 5,525,883 A | 6/1996 | Avitzour | |
| 5,542,146 A | 8/1996 | Hoekstra et al. | |
| 5,646,738 A * | 7/1997 | Honkawa | B41F 33/0063 |
| | | | 101/DIG. 45 |
| 5,666,194 A * | 9/1997 | Denton | G03G 15/5041 |
| | | | 399/53 |
| 5,722,109 A | 3/1998 | Delmas et al. | |
| 5,748,853 A | 5/1998 | Deschenes | |
| 5,764,251 A * | 6/1998 | Hashimoto | B41J 2/01 |
| | | | 347/19 |
| 6,021,363 A | 2/2000 | Nishikawa et al. | |
| 6,076,226 A | 6/2000 | Reed | |
| 6,076,227 A | 6/2000 | Schallig et al. | |
| 6,561,643 B1 * | 5/2003 | Walker | B41J 13/0054 |
| | | | 250/559.11 |
| 6,571,422 B1 | 6/2003 | Gordon et al. | |
| 6,600,167 B2 * | 7/2003 | Sano | G01V 8/20 |
| | | | 250/559.11 |
| 6,741,363 B1 | 5/2004 | Kaupert | |
| 6,941,199 B1 | 9/2005 | Bottomley et al. | |
| 7,079,923 B2 | 7/2006 | Abramson et al. | |
| 7,218,386 B2 * | 5/2007 | Alcock | G01N 21/474 |
| | | | 356/71 |
| 7,225,500 B2 | 6/2007 | Diehl et al. | |
| 7,237,298 B2 | 7/2007 | Reindle et al. | |
| 7,269,877 B2 | 9/2007 | Tondra et al. | |
| 7,272,868 B2 | 9/2007 | Im et al. | |
| 7,424,766 B2 | 9/2008 | Reindle et al. | |
| 7,507,948 B2 | 3/2009 | Park et al. | |
| 7,599,758 B2 | 10/2009 | Reindle et al. | |
| 7,626,709 B2 * | 12/2009 | Schwarz | G01N 21/474 |
| | | | 356/600 |
| 7,631,394 B2 | 12/2009 | Oh et al. | |
| 7,633,612 B2 * | 12/2009 | Schwarz | G01N 21/474 |
| | | | 356/600 |
| 7,659,994 B2 * | 2/2010 | Sperling | G01J 3/10 |
| | | | 356/600 |
| 7,741,629 B2 * | 6/2010 | Schwarz | G01N 21/55 |
| | | | 250/559.01 |
| 7,751,741 B2 * | 7/2010 | Hirai | G01J 1/4223 |
| | | | 399/74 |
| 7,827,654 B2 | 11/2010 | Nishikawa | |
| 7,834,991 B2 * | 11/2010 | Schwarz | G01N 21/4738 |
| | | | 356/237.1 |
| 7,971,315 B2 | 7/2011 | Kim et al. | |
| 8,032,978 B2 | 10/2011 | Haegermarck | |
| 8,275,506 B1 | 9/2012 | Bishel | |
| 8,346,389 B2 | 1/2013 | Kim et al. | |
| 8,455,851 B2 * | 6/2013 | Tanaka | G03G 15/5058 |
| | | | 399/49 |
| 8,463,018 B2 | 6/2013 | Chung et al. | |
| 8,467,065 B2 * | 6/2013 | Suzuki | G03G 15/0131 |
| | | | 356/445 |
| 8,525,975 B2 | 9/2013 | Chen et al. | |
| 8,735,824 B2 | 5/2014 | Hong et al. | |
| 8,755,591 B2 | 6/2014 | Chung et al. | |
| 8,788,092 B2 * | 7/2014 | Casey | G05D 1/0238 |
| | | | 700/245 |
| 8,862,271 B2 | 10/2014 | Shamlian et al. | |
| 8,942,583 B2 * | 1/2015 | Hoshi | G03G 15/5029 |
| | | | 399/45 |
| 9,116,130 B2 * | 8/2015 | Suzuki | G01N 21/55 |
| 9,259,129 B2 | 2/2016 | Jang et al. | |
| 9,375,842 B2 | 6/2016 | Shamlian et al. | |
| 9,377,739 B2 * | 6/2016 | Masuda | G03G 15/0178 |
| 9,399,284 B2 | 7/2016 | Kwon et al. | |
| 9,414,731 B2 | 8/2016 | Soejima | |
| 9,427,875 B2 | 8/2016 | Goel et al. | |
| 9,442,488 B2 | 9/2016 | Shamlian et al. | |
| 9,456,725 B2 | 10/2016 | Kim et al. | |
| 9,474,427 B2 | 10/2016 | Lee et al. | |
| 9,510,715 B2 | 12/2016 | Van Den Bogert | |
| 9,609,991 B2 | 4/2017 | Hillman, Jr. et al. | |
| 9,629,514 B2 | 4/2017 | Hillen et al. | |
| 9,731,919 B2 * | 8/2017 | Saito | B65H 5/062 |
| 9,763,551 B2 | 9/2017 | Murchie et al. | |
| 9,798,328 B2 | 10/2017 | Vicenti | |
| 9,843,905 B1 | 12/2017 | Wirola et al. | |
| 9,877,626 B2 | 1/2018 | Ebrahimi Afrouzi | |
| 9,877,628 B2 | 1/2018 | Park | |
| 9,919,425 B2 | 3/2018 | Bushman et al. | |
| 9,946,263 B2 | 4/2018 | Lindhe et al. | |
| 9,968,233 B2 * | 5/2018 | Strang | A47L 11/4011 |
| 9,969,089 B2 | 5/2018 | Goel et al. | |
| 9,993,129 B2 | 6/2018 | Santini | |
| 10,022,028 B2 | 7/2018 | Tsuboi et al. | |
| 10,031,457 B2 * | 7/2018 | Oba | G01N 21/21 |
| 10,178,933 B2 | 1/2019 | Lee et al. | |
| 10,203,641 B2 * | 2/2019 | Takenaga | G03G 15/5029 |
| 10,247,669 B2 | 4/2019 | Windorfer | |
| 10,293,489 B1 | 5/2019 | Cui et al. | |
| 10,296,007 B2 | 5/2019 | Vicenti | |
| 10,327,614 B2 | 6/2019 | Hillen et al. | |
| 10,429,851 B2 * | 10/2019 | Shamlian | G01B 11/026 |
| 10,433,697 B2 | 10/2019 | Lindhe et al. | |
| 10,459,390 B2 * | 10/2019 | Takahashi | G03G 15/5054 |
| 10,463,220 B2 | 11/2019 | Jee et al. | |
| 10,551,843 B2 | 2/2020 | Yee et al. | |
| 10,578,546 B2 * | 3/2020 | Kawano | G01N 21/474 |
| 10,588,475 B2 * | 3/2020 | Koura | A47L 9/009 |
| 10,627,518 B2 * | 4/2020 | Chen | H04N 23/56 |
| 10,722,088 B2 * | 7/2020 | Son | G01B 11/22 |
| 10,795,377 B2 | 10/2020 | Afrouzi et al. | |
| 10,866,542 B2 * | 12/2020 | Ino | G03G 15/5062 |
| 10,933,534 B1 | 3/2021 | Ebrahimi Afrouzi et al. | |
| 11,116,374 B2 | 9/2021 | Dhindsa et al. | |
| 11,126,130 B2 * | 9/2021 | Ishido | G01J 1/4228 |
| 11,147,424 B2 | 10/2021 | So et al. | |
| 11,202,543 B2 | 12/2021 | Pohlman et al. | |
| 11,231,720 B2 * | 1/2022 | Yi | G05D 1/0242 |
| 11,234,571 B2 | 2/2022 | Yan et al. | |
| 11,274,929 B1 | 3/2022 | Afrouzi | |
| 11,278,174 B2 | 3/2022 | So et al. | |
| 11,397,262 B2 * | 7/2022 | Gordon | A47L 9/281 |
| 11,449,061 B2 * | 9/2022 | Ebrahimi Afrouzi | |
| | | | G05D 1/0219 |
| 11,467,587 B2 * | 10/2022 | Ebrahimi Afrouzi | |
| | | | G05D 1/0214 |
| 12,185,902 B2 * | 1/2025 | Yang | A47L 11/4011 |
| 2002/0051648 A1 * | 5/2002 | Shimomura | G03G 15/0194 |
| | | | 399/49 |
| 2002/0116089 A1 | 8/2002 | Kirkpatrick, Jr. | |
| 2004/0204792 A1 * | 10/2004 | Taylor | A47L 9/2826 |
| | | | 700/245 |
| 2004/0220698 A1 | 11/2004 | Taylor et al. | |
| 2004/0244138 A1 | 12/2004 | Taylor et al. | |
| 2005/0000543 A1 * | 1/2005 | Taylor | G05D 1/0274 |
| | | | 134/18 |
| 2005/0010331 A1 | 1/2005 | Taylor et al. | |
| 2005/0137749 A1 | 6/2005 | Jeon et al. | |
| 2005/0166354 A1 | 8/2005 | Uehigashi | |
| 2010/0125968 A1 | 5/2010 | Ho | |
| 2011/0099747 A1 | 5/2011 | Kim et al. | |
| 2012/0125363 A1 | 5/2012 | Kim et al. | |
| 2013/0058635 A1 | 3/2013 | Vrdoljak | |

(56) References Cited

U.S. PATENT DOCUMENTS

| | | |
|---|---|---|
| 2013/0073088 A1 | 3/2013 | Lee et al. |
| 2013/0152337 A1 | 6/2013 | Thorne |
| 2013/0204463 A1 | 8/2013 | Chiappetta |
| 2013/0211589 A1* | 8/2013 | Landry ............... A47L 11/4011 |
| | | 700/253 |
| 2014/0058611 A1 | 2/2014 | Borinato |
| 2014/0075689 A1 | 3/2014 | Windorfer |
| 2014/0114525 A1 | 4/2014 | Ebrahimi Afrouzi |
| 2014/0150201 A1 | 6/2014 | Mcgee et al. |
| 2014/0166047 A1 | 6/2014 | Hillen et al. |
| 2015/0013102 A1 | 1/2015 | Bilger |
| 2015/0040340 A1 | 2/2015 | Bilger et al. |
| 2015/0135474 A1 | 5/2015 | Gidwell |
| 2015/0297054 A1 | 10/2015 | Weeks et al. |
| 2015/0351596 A1 | 12/2015 | Thorne |
| 2016/0016312 A1 | 1/2016 | Lawrence et al. |
| 2016/0128530 A1 | 5/2016 | Thorne et al. |
| 2016/0174793 A1 | 6/2016 | Burke et al. |
| 2016/0220080 A1 | 8/2016 | Thorne |
| 2016/0220081 A1 | 8/2016 | Xu et al. |
| 2016/0220082 A1 | 8/2016 | Thorne et al. |
| 2016/0287044 A1 | 10/2016 | Tanaka et al. |
| 2016/0324388 A1 | 11/2016 | Vrdoljak et al. |
| 2016/0374533 A1 | 12/2016 | Innes et al. |
| 2017/0000305 A1 | 1/2017 | Gordon et al. |
| 2017/0042319 A1 | 2/2017 | Conrad et al. |
| 2017/0112343 A1 | 4/2017 | Innes et al. |
| 2017/0127896 A1 | 5/2017 | Carter et al. |
| 2017/0144810 A1 | 5/2017 | Birdsell |
| 2017/0215667 A1 | 8/2017 | Thorne et al. |
| 2017/0344019 A1 | 11/2017 | Haegermarck et al. |
| 2017/0347848 A1 | 12/2017 | Carter et al. |
| 2018/0035854 A1 | 2/2018 | Thorne |
| 2018/0064301 A1 | 3/2018 | Cottrell et al. |
| 2018/0068815 A1 | 3/2018 | Cottrell |
| 2018/0070785 A1 | 3/2018 | Udy et al. |
| 2018/0088585 A1 | 3/2018 | Vicenti |
| 2018/0125003 A1 | 5/2018 | Wu et al. |
| 2018/0213992 A1 | 8/2018 | Koetz et al. |
| 2018/0255991 A1 | 9/2018 | Der Marderosian et al. |
| 2018/0255997 A1 | 9/2018 | So et al. |
| 2018/0289231 A1 | 10/2018 | Santini |
| 2018/0296046 A1 | 10/2018 | Thorne et al. |
| 2018/0306432 A1 | 10/2018 | Ognjen et al. |
| 2018/0325252 A1 | 11/2018 | Hopke et al. |
| 2018/0338654 A1 | 11/2018 | Kelsey |
| 2018/0338656 A1 | 11/2018 | Carter et al. |
| 2018/0368642 A1 | 12/2018 | Son et al. |
| 2019/0018420 A1 | 1/2019 | Yee et al. |
| 2019/0021567 A1 | 1/2019 | Zhou |
| 2019/0038098 A1 | 2/2019 | Thorne et al. |
| 2019/0059668 A1 | 2/2019 | Thorne et al. |
| 2019/0069740 A1 | 3/2019 | Thorne et al. |
| 2019/0069744 A1 | 3/2019 | Liggett et al. |
| 2019/0090701 A1 | 3/2019 | Tonderys et al. |
| 2019/0090705 A1 | 3/2019 | Thorne et al. |
| 2019/0155299 A1 | 5/2019 | Yi et al. |
| 2019/0186923 A1 | 6/2019 | Servos et al. |
| 2019/0191947 A1 | 6/2019 | Freese et al. |
| 2019/0193120 A1 | 6/2019 | Brown et al. |
| 2019/0204442 A1 | 7/2019 | Woo et al. |
| 2019/0246853 A1 | 8/2019 | Sardar et al. |
| 2019/0258262 A1 | 8/2019 | Vicenti |
| 2019/0274500 A1 | 9/2019 | Thorne et al. |
| 2019/0274501 A1 | 9/2019 | Antonisami et al. |
| 2019/0274505 A1 | 9/2019 | Ng et al. |
| 2019/0302793 A1 | 10/2019 | Leech et al. |
| 2019/0320865 A1 | 10/2019 | Brown et al. |
| 2019/0320866 A1 | 10/2019 | Thorne et al. |
| 2019/0335968 A1 | 11/2019 | Harting et al. |
| 2019/0343349 A1 | 11/2019 | Clare et al. |
| 2019/0357740 A1 | 11/2019 | Thorne et al. |
| 2020/0000298 A1 | 1/2020 | Brown et al. |
| 2020/0022543 A1 | 1/2020 | Gill et al. |
| 2020/0022544 A1 | 1/2020 | Gill et al. |

| | | |
|---|---|---|
| 2020/0022553 A1 | 1/2020 | Gill et al. |
| 2020/0037833 A1 | 2/2020 | Niedzwecki et al. |
| 2020/0037843 A1 | 2/2020 | Fiebig et al. |
| 2020/0046184 A1 | 2/2020 | Freese et al. |
| 2020/0077855 A1 | 3/2020 | Brown et al. |
| 2020/0081365 A1* | 3/2020 | Araki .................... G01N 21/27 |
| 2020/0085267 A1 | 3/2020 | Thorne et al. |
| 2020/0085269 A1 | 3/2020 | Thorne |
| 2020/0121144 A1 | 4/2020 | Gacin et al. |
| 2020/0121148 A1 | 4/2020 | Hoffman et al. |
| 2020/0138260 A1 | 5/2020 | Sutter et al. |
| 2020/0166949 A1 | 5/2020 | Leech et al. |
| 2020/0170470 A1 | 6/2020 | Liggett et al. |
| 2020/0201348 A1 | 6/2020 | Leech |
| 2020/0205631 A1 | 7/2020 | Brown et al. |
| 2020/0205634 A1 | 7/2020 | Sutter et al. |
| 2020/0237171 A1 | 7/2020 | Xu et al. |
| 2020/0288929 A1 | 9/2020 | Brunner |
| 2020/0288930 A1 | 9/2020 | Wells |
| 2020/0297172 A1 | 9/2020 | Tonderys et al. |
| 2020/0301430 A1 | 9/2020 | Irkliy et al. |
| 2020/0315418 A1 | 10/2020 | Howard et al. |
| 2020/0345196 A1 | 11/2020 | Innes et al. |
| 2020/0367711 A1 | 11/2020 | Thorne et al. |
| 2020/0371526 A1 | 11/2020 | Kamada |
| 2020/0383547 A1 | 12/2020 | Sutter et al. |
| 2021/0007569 A1 | 1/2021 | Howard et al. |
| 2021/0022574 A1 | 1/2021 | Harting |
| 2021/0030227 A1 | 2/2021 | Mathieu et al. |
| 2021/0038032 A1 | 2/2021 | Brown |
| 2021/0059495 A1 | 3/2021 | Gill et al. |
| 2021/0085144 A1 | 3/2021 | Woodrow et al. |
| 2021/0169289 A1 | 6/2021 | Thorne et al. |
| 2021/0175772 A1 | 6/2021 | Aini |
| 2021/0177223 A1 | 6/2021 | Der Marderosian et al. |
| 2021/0186282 A1 | 6/2021 | Mathieu et al. |
| 2021/0204684 A1 | 7/2021 | Heman-Ackah et al. |
| 2021/0254615 A1 | 8/2021 | Burbank |
| 2021/0307581 A1 | 10/2021 | Thorne et al. |
| 2021/0315428 A1 | 10/2021 | Udy et al. |
| 2021/0386261 A1 | 12/2021 | Woodrow et al. |
| 2021/0386262 A1 | 12/2021 | Uchendu et al. |
| 2022/0031131 A1 | 2/2022 | Mcclay et al. |
| 2022/0031133 A1 | 2/2022 | Der Marderosian et al. |
| 2022/0031134 A1 | 2/2022 | Yang et al. |
| 2022/0061614 A1 | 3/2022 | Yu et al. |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |
| 2022/0322903 A1 | 10/2022 | Lessard |
| 2022/0400922 A1 | 12/2022 | Mcclay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0248192 A1 | 8/2023 | Brown et al. |
| 2023/0255422 A1 | 8/2023 | Camplani et al. |
| 2023/0329502 A1 | 10/2023 | Chirikjian |
| 2024/0415352 A1 | 12/2024 | Mcclay et al. |

FOREIGN PATENT DOCUMENTS

| | | |
|---|---|---|
| CN | 200954080 Y | 10/2007 |
| CN | 103217898 A | 7/2013 |
| CN | 103217977 A | 7/2013 |
| CN | 103458755 A | 12/2013 |
| CN | 104068787 A | 10/2014 |
| CN | 104111651 A | 10/2014 |
| CN | 104111652 A | 10/2014 |
| CN | 104245244 | 12/2014 |
| CN | 104750105 A | 7/2015 |
| CN | 106843202 A | 6/2017 |
| CN | 210277064 | 4/2020 |
| DE | 10113105 A1 | 10/2001 |
| DE | 19932552 A1 | 8/2002 |
| DE | 10311299 B3 | 4/2004 |
| DE | 10302908 A1 | 8/2004 |
| DE | 10346216 B3 | 9/2004 |

(56) References Cited

FOREIGN PATENT DOCUMENTS

| | | | |
|---|---|---|---|
| DE | 10327223 | A1 | 1/2005 |
| DE | 102005013365 | | 9/2006 |
| DE | 102007016802 | | 5/2008 |
| DE | 102007061385 | | 6/2009 |
| DE | 102012110996 | | 5/2014 |
| DE | 102013203659 | | 9/2014 |
| EP | 1136027 | A2 | 9/2001 |
| EP | 1548532 | A1 | 6/2005 |
| EP | 2457486 | | 5/2012 |
| EP | 2583608 | | 4/2013 |
| EP | 3332685 | | 6/2018 |
| GB | 2462720 | A | 2/2010 |
| GB | 2497452 | A | 6/2013 |
| GB | 2513960 | A | 11/2014 |
| JP | H02241423 | | 9/1990 |
| JP | H06189877 | | 7/1994 |
| JP | H7136094 | | 5/1995 |
| JP | H07136094 | A * | 5/1995 |
| JP | 2002323925 | A | 11/2002 |
| JP | 2002323926 | A | 11/2002 |
| JP | 2003225184 | A | 8/2003 |
| JP | 2003346150 | A | 12/2003 |
| JP | 2005205028 | A | 8/2005 |
| JP | 2005230044 | A | 9/2005 |
| JP | 2007323119 | A | 12/2007 |
| JP | 2007334666 | A | 12/2007 |
| JP | 2010057647 | A | 3/2010 |
| JP | 4689292 | B2 * | 5/2011 |
| JP | 2014021419 | A * | 2/2014 |
| JP | 2014079515 | A | 5/2014 |
| JP | 2018078222 | A * | 5/2018 |
| KR | 20090019480 | A * | 2/2009 |
| KR | 101052166 | B1 * | 7/2011 |
| KR | 20110109705 | | 10/2011 |
| KR | 101156282 | | 6/2012 |
| KR | 101156282 | B1 * | 6/2012 |
| KR | 1020130053286 | | 5/2013 |
| KR | 20130070102 | A * | 6/2013 |
| KR | 20130105274 | A * | 9/2013 |
| TW | 200948333 | A | 12/2009 |
| WO | 2000036969 | A1 | 6/2000 |
| WO | 2002062194 | | 8/2002 |
| WO | 2006046044 | A1 | 5/2006 |
| WO | 2007051972 | A1 | 5/2007 |
| WO | 2008136570 | A1 | 11/2008 |
| WO | 2013081516 | A1 | 6/2013 |
| WO | 2016057181 | A1 | 4/2016 |

OTHER PUBLICATIONS

Eidomohammadi, Nazli, "Wet and Dry Robotic Vacuum Cleaner a Concept Development Process," Master of Science Thesis, Chalmers University of Technology, Sweden; (2014), 132 pages.

Everett, Dave, "Ultrasonic method for measuring surface hardness," Mowbot Project; https://web.archive.org/web/19991009123141/http://www.idx.com.au/~d . . . , 1 page.

Gavin, Andrew S., "A fast, cheap, and easy vision system for an autonomous vacuum cleaner," Massachusetts Institute of Technology Artificial Intelligence Laboratory, Cambridge, MA; AAAI Technical Report FS-93-03; (1993); 10 pages.

Hicks, II, et al., "A Survey of Robot Lawn Mowers," Center for Robotics Research, ML 72, University of Cincinnati, OH, Proceedings of SPIE, vol. 4197; (2000); 8 pages.

Kuotsan et al, "A Technical Analysis of Autonomous Floor Cleaning Robots Based on US Granted Patents," European International Journal of Science and Technology, vol. 2 No. 7; (Sep. 2013); 18 pages.

"LG HomBot 3.0 Robotic Vacuum Review—Pros and Cons", Roboticall, https://www.roboticall.com/lg-hombot-3-0-robotic-vacuum/; (2014); 21 pages.

Rafaels, "The Lawn Ranger," Radio Electronics vol. 61 No. 6, (Jun. 1990); 92 pages.

PCT Search Report and Written Opinion, mailed Sep. 2, 2021, received in corresponding PCT Application No. PCT/US2021/037028, 10 pages.

PCT Search Report and Written Opinion, mailed Sep. 15, 2021, received in corresponding PCT Application No. PCT/US2021/37035, 11 pages.

Extended European Search Report dated Oct. 24, 2024, received in European Patent Application No. 21821422.9, 9 pages.

U.S. Office Action issued Oct. 31, 2024, received in U.S. Appl. No. 17/345,695, 45 pages.

US Office Action issued Jun. 5, 2023, received in U.S. Appl. No. 17/345,695, 25 pages.

US Office Action issued Dec. 8, 2023, received in U.S. Appl. No. 17/345,695, 25 pages.

Extended European Search Report issued Jun. 25, 2024, received in European Patent Application No. 21822537.3, 7 pages.

U.S. Office Action issued Jul. 8, 2024, received in U.S. Appl. No. 17/345,695, 44 pages.

Chinese Office Action with machine-generated English translation issued Jun. 20, 2025, received in Chinese Application No. 202180048115.6, 15 pages.

* cited by examiner

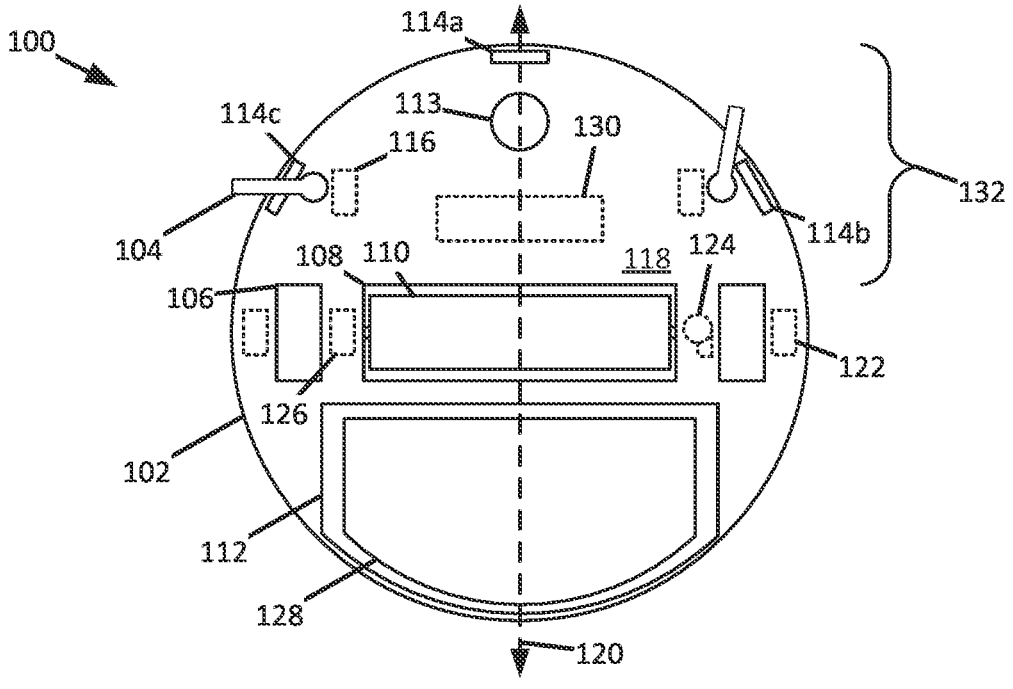
FIG. 1
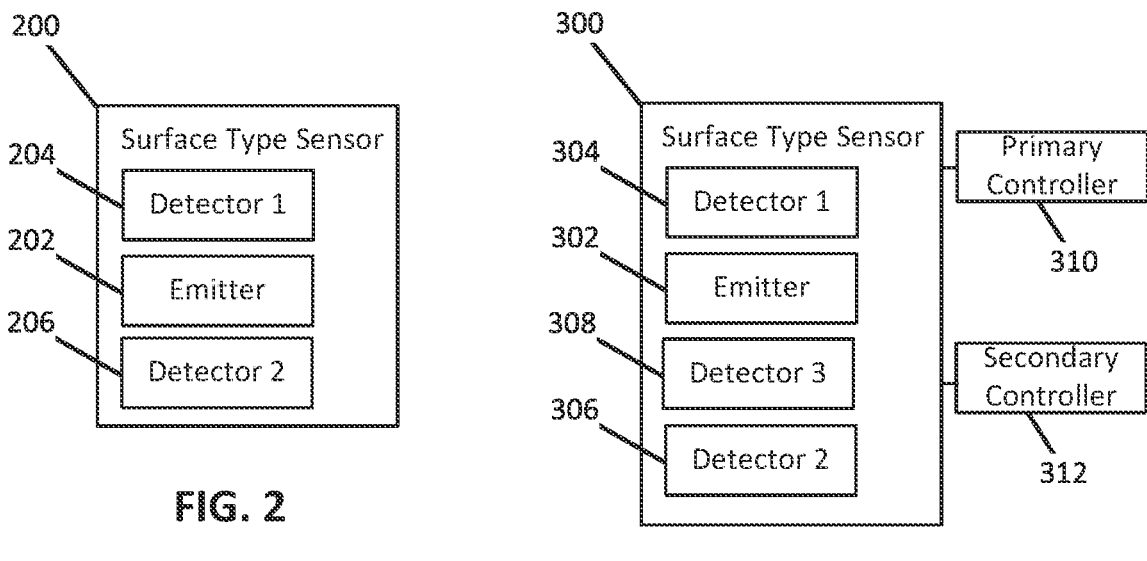
FIG. 2
FIG. 3

700

702 Receive first signal from first and second receivers when emitter is in an on-state 704 Receive second signal from first and second receivers when emitter is in an off-state 706 Compare first and second signals 708 Determine surface type

800

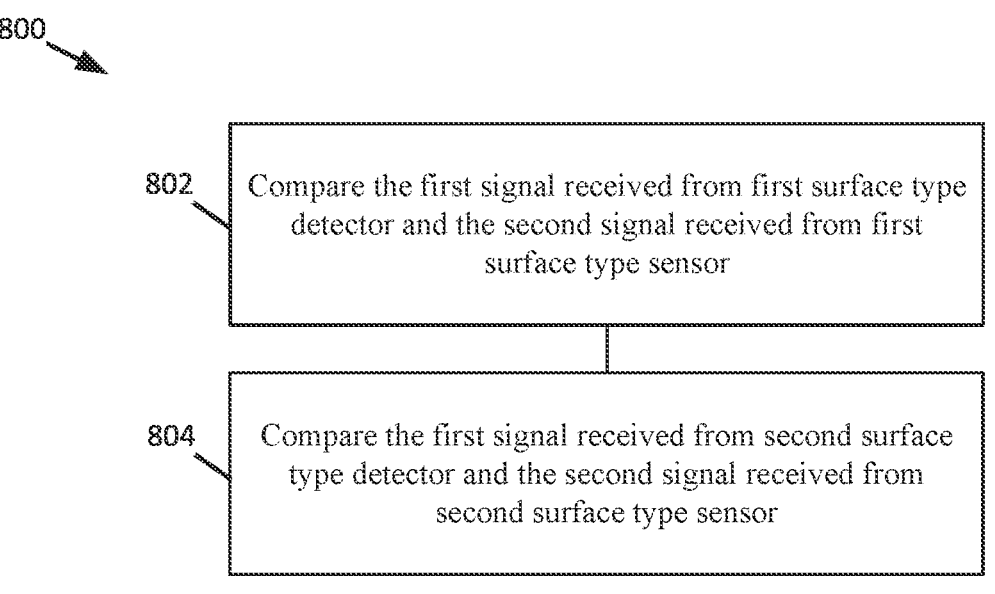

802  Compare the first signal received from first surface type detector and the second signal received from first surface type sensor 804  Compare the first signal received from second surface type detector and the second signal received from second surface type sensor

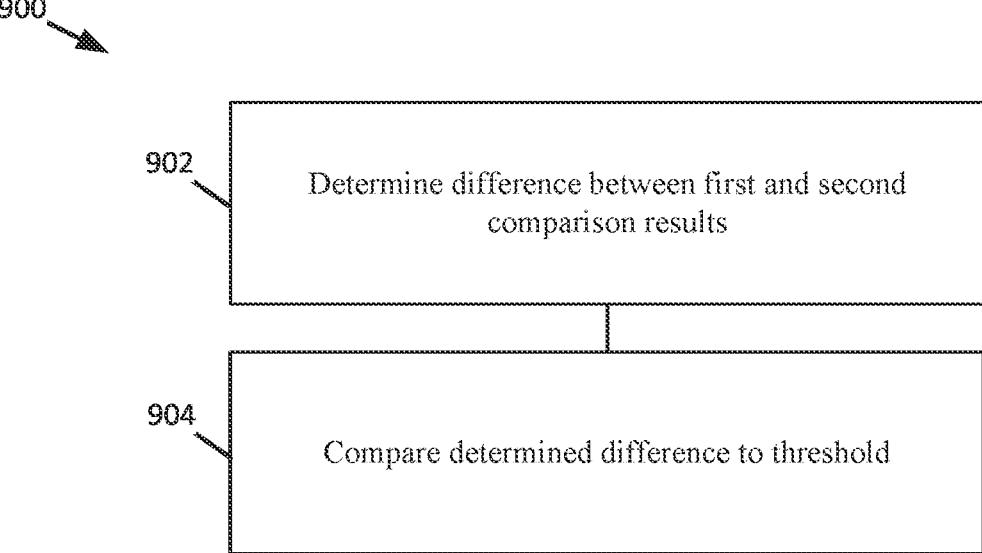

902  Determine difference between first and second comparison results

904  Compare determined difference to threshold

Determine ratio of first and second comparison results

1004

Compare determined ratio to threshold

1100

1102

Determine an adjusted ratio

1104

Compare the adjusted ratio to threshold

ROBOTIC CLEANER HAVING SURFACE TYPE SENSOR

CROSS-REFERENCE TO RELATED APPLICATIONS

The present application claims the benefit of U.S. Provisional Application Ser. No. 63/038,425 filed on Jun. 12, 2020, entitled Robotic Vacuum Cleaner having Surface Type Detection using Sensor Fusion and of U.S. Provisional Application Ser. No. 63/074,260 filed on Sep. 3, 2020, entitled Robotic Cleaner having Surface Type Sensor, each of which are fully incorporated herein by reference.

TECHNICAL FIELD

The present disclosure is generally directed to surface treatment apparatuses and more specifically to a robotic cleaner.

BACKGROUND INFORMATION

Surface treatment apparatuses can include robotic cleaners. A robotic cleaner is configured to autonomously travel about a surface while collecting debris left on the surface. A robotic cleaner can be configured to travel along a surface according to a random and/or predetermined path. When traveling along a surface according to the random path, the robotic cleaner may adjust its travel path in response to encountering one or more obstacles. When traveling along a surface according to a predetermined path, the robotic cleaner may have, in prior operations, developed a map of the area to be cleaned and travel about the area according to a predetermined path based on the map. Regardless of whether the robotic cleaner is configured to travel according to a random or predetermined path, the robotic cleaner may be configured to travel in predetermined patterns. For example, a robotic cleaner may be positioned in a location of increased debris and be caused to enter a cleaning pattern that causes the robotic cleaner to remain in the location of increased debris for a predetermined time.

BRIEF DESCRIPTION OF THE DRAWINGS

These and other features and advantages will be better understood by reading the following detailed description, taken together with the drawings, wherein:

FIG. 1 is a schematic bottom view of an example of a robotic cleaner, consistent with embodiments of the present disclosure.

FIG. 2 is a schematic block diagram of an example of a surface type sensor, consistent with embodiments of the present disclosure.

FIG. 3 is a schematic block diagram of a combination floor type sensor, consistent with embodiments of the present disclosure.

FIG. 8 is a flow chart of an example of a method corresponding to a step of the method of detecting a surface type of FIG. 7, consistent with embodiments of the present disclosure.

FIG. 9 is a flow chart of an example of a method corresponding to a step of the method of detecting a surface type of FIG. 7, consistent with embodiments of the present disclosure.

DETAILED DESCRIPTION

Figure 4A:
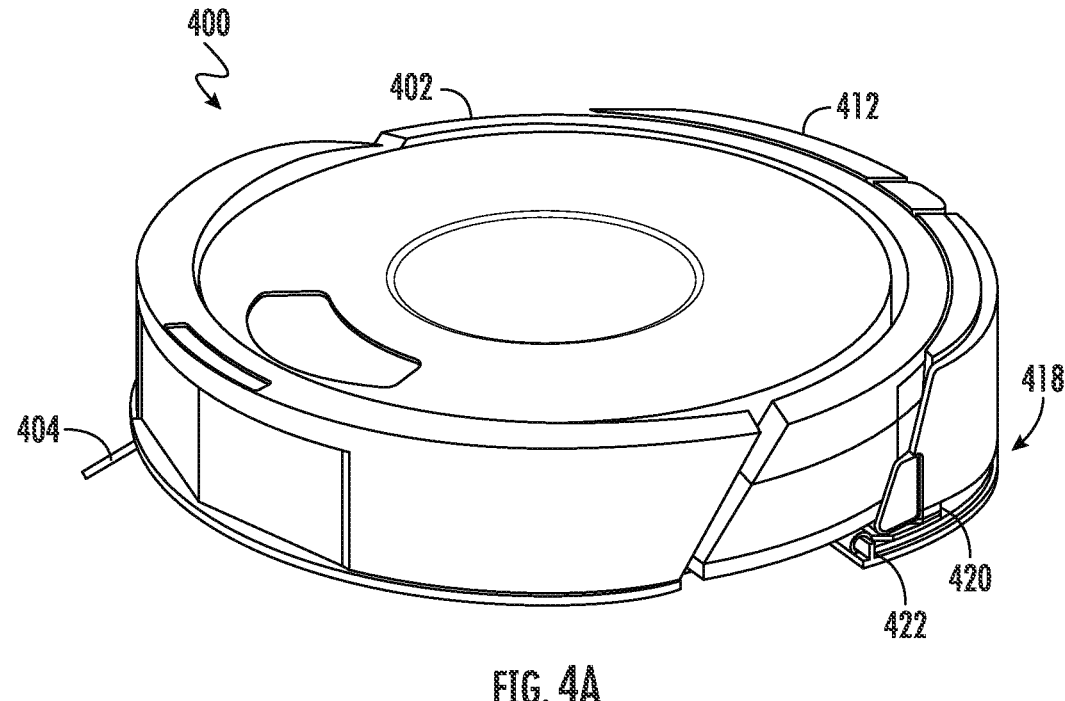
FIG. 4A is a perspective top view of an example of a robotic cleaner, consistent with embodiments of the present disclosure.

The present disclosure is generally directed to a robotic cleaner (e.g., a robotic vacuum cleaner). The robotic cleaner may include a suction motor configured to generate suction at an air inlet, at least one side brush having a side brush motor, the side brush being configured to urge debris on a surface towards the air inlet, a dust cup for collecting debris urged into the air inlet, and a surface type sensor. The surface type sensor is configured to detect a surface type based, at least in part, on light reflected from a surface to be cleaned.

FIG. 1 shows a schematic bottom view of a robotic cleaner 100. As shown, the robotic cleaner 100 includes a main body 102, one or more side brushes 104 rotatable relative to the main body 102, one or more drive wheels 106 coupled to the main body 102 and configured to urge the robotic cleaner 100 over a surface to be cleaned, an air inlet 108 having a rotatable agitator 110 disposed therein, a dust cup 112, a non-driven supporting wheel 113 (e.g., a caster wheel), and one or more surface type sensors 114 coupled to the main body 102. The one or more surface type sensors 114 may be used to detect a surface type using, for example, light (e.g., infrared light) reflected from a surface to be cleaned.

The one or more side brushes 104 may be driven by a corresponding side brush motor 116 (shown in hidden lines) disposed within the main body 102. Activation of the side brush motor 116 causes a corresponding rotation in a respective side brush 104 about an axis that extends transverse to (e.g., substantially perpendicular to) a bottom surface 118 of the main body 102. Rotation of the one or more side brushes 104 urges debris on a surface to be cleaned (e.g., a floor) towards a central axis 120 of the main body 102, wherein the central axis 120 extends parallel to a direction of forward movement of the robotic cleaner. In other words, rotation of the one or more side brushes 104 urges debris on a surface to be cleaned (e.g., a floor) towards the air inlet 108.

The one or more drive wheels 106 may be driven by a corresponding drive motor 122 (shown in hidden lines). Activation of the drive motor 122 causes a corresponding rotation in a respective drive wheel 106. Differential rotation of a plurality of drive wheels 106 can be used to steer the robotic cleaner 100 over the surface to be cleaned.

The air inlet 108 can be fluidly coupled to a suction motor 124. The suction motor 124 is configured to cause a suction force to be generated at the air inlet 108 such that debris deposited on the surface to be cleaned can be urged into the air inlet 108. The rotatable agitator 110 can be driven by a corresponding agitator motor 126. Rotation of the rotatable agitator 110 may cause at least a portion of the rotatable agitator 110 to engage the surface to be cleaned and dislodge at least a portion of debris deposited thereon. Dislodged debris may then be suctioned into the air inlet 108 as a result of the suction generated by the suction motor 124.

The dust cup 112 is fluidly coupled to the air inlet 108 and the suction motor 124 such that at least a portion of debris suctioned into the air inlet 108 can be deposited within the dust cup 112. The dust cup 112 may also include a pad 128 that is removably coupled thereto. The pad 128 may be configured to receive a liquid such that the robotic cleaner 100 can engage in wet cleaning.

As shown, the robotic cleaner 100 may include a forward surface type sensor 114a, a left surface type sensor 114b, and a right surface type sensor 114c. For example, the left surface type sensor 114b and the right surface type sensor 114c may be disposed on opposite sides of the central axis 120 of the main body 102 and the forward surface type sensor 114a may be positioned such that the central axis 120 extends through the forward surface type sensor 114a. However, other configurations are possible. For example, the robotic cleaner 100 may include only the left and right surface type sensors 114b and 114c arranged on opposite sides of the central axis 120 of the main body 102. By way of further example, the robotic cleaner 100 may include only the forward surface type sensor 114a arranged on the central axis 120 such that the central axis 120 extends through the forward surface type sensor 114a. The inclusion of the left and right surface type sensors 114b and 114c allows the robotic cleaner 100 to determine (e.g., using a controller 130) an orientation of the robotic cleaner 100 relative to a transition in surface type (e.g., such that the robotic cleaner 100 can be controlled to follow the transition in surface type).

The surface type sensors 114a, 114b, and 114c can be coupled to and arranged around a periphery of the main body 102 of the robotic cleaner 100. For example, and as shown, the surface type sensors 114a, 114b, and 114c can be arranged about the periphery of a forward portion 132 of the main body 102. The forward portion 132 corresponds to the portion of the main body 102 extending from the one or more drive wheels 106 and in a direction of the one or more side brushes 104.

By arranging the surface type sensors 114a, 114b, and 114c along the periphery of the forward portion 132 of the main body 102, the robotic cleaner 100 may be capable of detecting a transition in surface type before the robotic cleaner 100 traverses the transition in surface type (e.g., one or more drive wheels 106 traverse the transition). For example, the robotic cleaner 100 can be configured to avoid traversing the transition in the surface type. As such, one or more of the cleaning implements (e.g., the rotatable agitator 110 and/or the pad 128) may be prevented from traversing the transition in surface type. This may prevent, for example, a wet pad 128 from contacting a carpeted surface (potentially preventing damage to the carpeted surface). In some instances, the surface type sensor 114 may only be activated when the robotic cleaner 100 is engaging in wet cleaning (e.g., the pad 128 is wet). This may result in reduced power consumption and/or reduce the processing load of the controller 130. In other instances, the surface type sensor 114 may be active in both wet and dry cleaning operations.

FIG. 2 shows a schematic block diagram of a surface type sensor 200, which may be an example of the surface type sensor 114 of FIG. 1. As shown, the surface type sensor 200 includes an emitter 202, a first detector 204, and a second detector 206. The emitter 202 is configured to emit light (e.g., infrared light) towards a surface to be cleaned. The first and second detectors 204 and 206 are configured to detect at least a portion of the emitted light that is reflected from the surface to be cleaned. For example, one of the first or second detectors 204 or 206 can be configured to detect diffuse light reflected from the surface to be cleaned and the other of the first or second detectors 204 or 206 can be configured to detect specular light reflected from the surface to be cleaned. A surface type (e.g., carpet, hard floor, or any other surface type) of the surface to be cleaned may be determined based, at least in part, on a comparison of signals output from the first and second detectors 204 and 206 in response to the reflected light being incident thereon. As such, the first and second detectors 204 and 206 may generally be described as being surface type detectors. In some instances, the signals generated by the first and second detectors 204 and 206 may indicative of a presence of a drop-off (e.g., an edge of a stair), wherein the robotic cleaner 100 is configured to determine a presence of a drop-off based, at least in part, on the signals.

FIG. 3 shows a schematic block diagram of a combination surface type sensor 300, which may be an example of the surface type sensor 114 of FIG. 1. As shown, the combination surface type sensor 300 includes an emitter 302, a first detector 304, a second detector 306, and a third detector 308. The emitter 302 is configured to emit light (e.g., infrared light) towards a surface to be cleaned. The first, second, and third detectors 304, 306, and 308 are configured to detect at least a portion of the emitted light that is reflected from the surface to be cleaned. For example, one of the first or second detectors 304 or 306 can be configured to detect diffuse light reflected from the surface to be cleaned and the other of the first or second detectors 304 or 306 can be configured to detect specular light reflected from the surface to be cleaned. A surface type (e.g., carpet, hard floor, or any other surface type) of the surface to be cleaned may be determined based, at least in part, on a comparison of signals output from the first and second detectors 304 and 306 in response to the reflected light being incident thereon. As such, the first and second detector 304 and 306 may generally be described as being surface type detectors. In this example, the third detector 308 may be configured to detect the presence or absence of the surface to be cleaned based, at least in part, on a detection of the emitted light that is reflected from the surface to be cleaned. As such, the third detector 308 may generally be described as being a drop-off detector that is configured to detect a drop-off (e.g., an edge of a stair).

As also shown in FIG. 3, the combination surface type sensor 300 may be communicatively coupled to a primary controller 310 and a secondary controller 312 of the robotic cleaner 100. The primary controller 310 may be configured to control higher level functions (e.g., cleaning behaviors) of the robotic cleaner 100. For example, the first and second detectors 304 and 306 (e.g., surface type detectors) may be communicatively coupled to the primary controller 310. In this example, the primary controller 310 may be configured to evaluate the signals generated by the first and second detectors 304 and 306 and to cause the robotic cleaner 100 to engage in a cleaning behavior (e.g., avoid a transition in surface type) based, at least in part, on the evaluation of the signals. The secondary controller 312 may be configured to control lower level functions (e.g., hazard avoidance behaviors) of the robotic cleaner 100. For example, the third detector 308 (e.g., a drop-off detector) may be communicatively coupled to the secondary controller 312. In this example, the secondary controller 312 may be configured to evaluate signals generated by the third detector 308 and to cause the robotic cleaner 100 to engage in a hazard avoidance behavior (e.g., avoid a drop-off) based, at least in part, on the evaluation of the signals. As such, the secondary controller 312 may be configured to override a behavior being executed on the primary controller 310 such that the robotic cleaner 100 can avoid a hazard that may cause harm to the robotic cleaner 100. In some instances, the secondary controller 312 may be more responsive to received signals than the primary controller 310, allowing the robotic cleaner 100 to react more quickly to the presence of a hazard. The emitter 302 may be communicatively coupled to the secondary controller 312. As such, illumination of the emitter 302 can be controlled by the secondary controller 312. Therefore, in some instances, the primary controller 310 and the secondary controller 312 may be communicatively coupled (e.g., via a timing cable), wherein a status (e.g., on or off) of the emitter 302 is communicated between the primary and secondary controller 310 and 312. Such a configuration, may allow the primary controller 310 to evaluate and/or differentiate between signals generated by the first and second detectors 304 and 306 when the emitter 302 is in an on-state and an off-state.

Figure 4B:
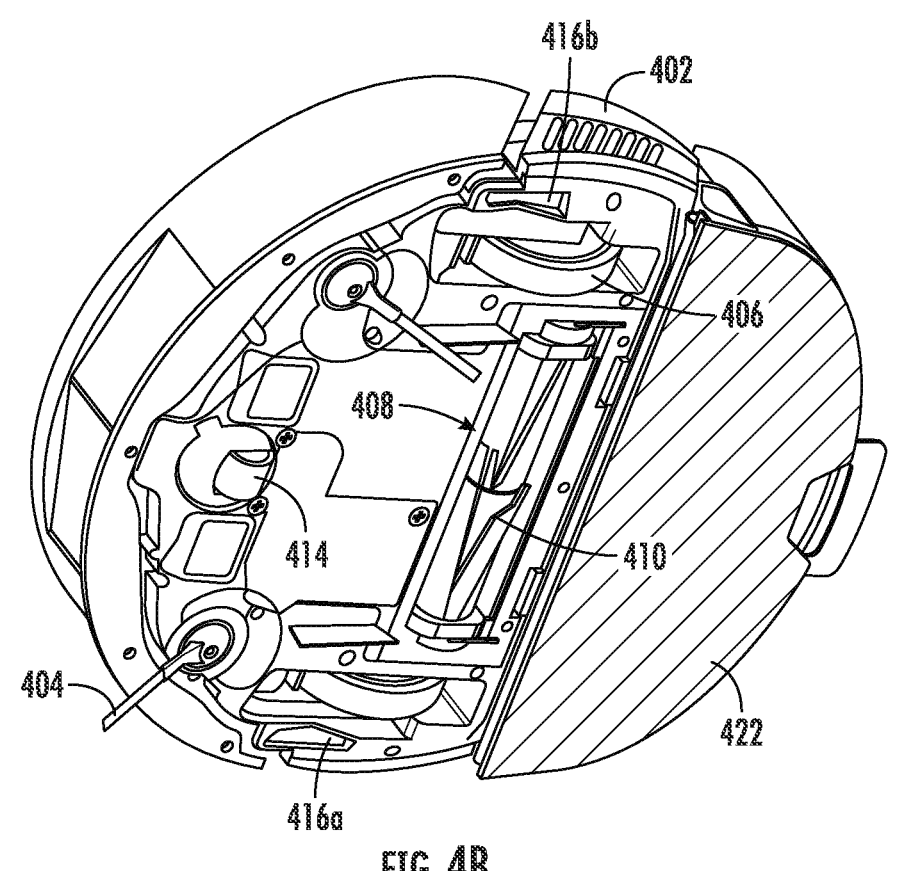
FIG. 4B is a perspective bottom view of the robotic cleaner of FIG. 4A, consistent with embodiments of the present disclosure.

FIG. 4A shows a perspective top view of a robotic cleaner 400 and FIG. 4B shows a perspective bottom view of the robotic cleaner 400, which may be an example of the robotic cleaner 100 of FIG. 1. As shown, the robotic cleaner 400 includes a main body 402, one or more side brushes 404, one or more drive wheels 406, an air inlet 408 having a rotatable agitator 410 disposed therein, a dust cup 412, a non-driven supporting wheel 414, and one or more surface type sensors 416. As shown, a wet cleaning module 418 may be removably coupled to the dust cup 412, wherein the wet cleaning module 418 includes a fluid tank 420 and a cleaning pad 422.

As shown, the robotic cleaner 400 includes a first (e.g., right) surface type sensor 416a and a second (e.g., left) surface type sensor 416b. The first and second surface type sensors 416a and 416b are disposed proximate to (e.g., spaced apart from by a distance measuring less than a largest dimension of the surface type sensor 416) a perimeter of the main body 402. For example, the first and second surface type sensors 416a and 416b may be disposed between a respective drive wheel 406 and the perimeter of the main body 402. In some instances, at least a portion of each of the surface type sensors 416a and 416b may extend along at least a portion of a side surface of a respective drive wheel 406. For example, at least a portion of the surface type sensors 416a and 416b may extend substantially (e.g., within 1°, 2°, 3°, 4°, or 5° of) parallel to and along at least a portion of a respective drive wheel 406.

Figure 5:
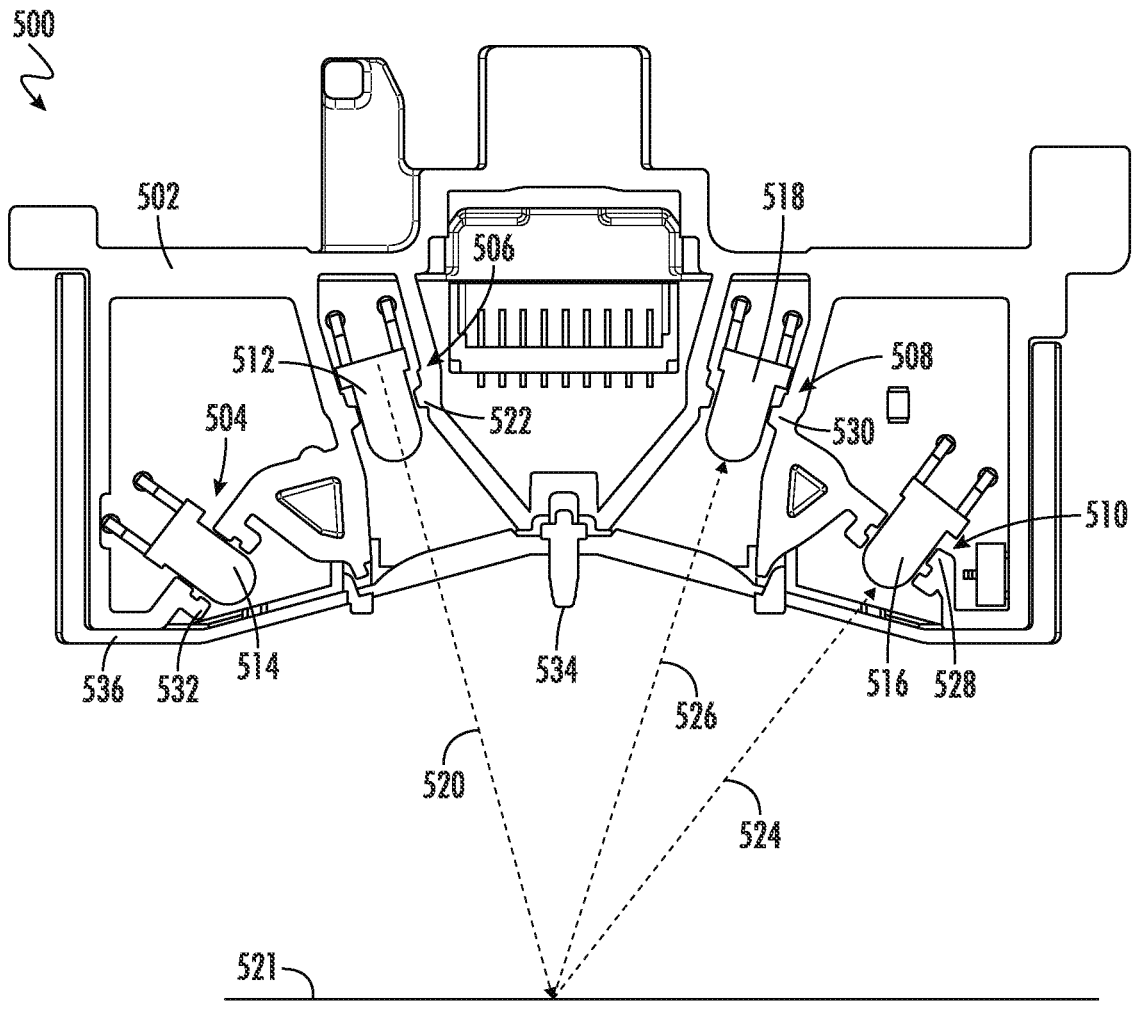
FIG. 5 is a cross-sectional view of an example of a combination surface type sensor, consistent with embodiments of the present disclosure.

FIG. 5 shows a cross-sectional view of a combination surface type sensor 500, which may be an example of the surface type sensor 416 of FIG. 4. As shown, the combination surface type sensor 500 includes a housing 502 having (e.g., defining) a first, second, third, and fourth receptacle 504, 506, 508, and 510, an emitter 512 (e.g., a light emitting diode) disposed within the second receptacle 506, a first surface type detector (e.g., a diffuse light detector) 514 disposed within the first receptacle 504, a second surface type detector (e.g., a specular light detector) 516 disposed within the fourth receptacle 510, and a drop-off detector 518 disposed within the third receptacle 508. As also shown, the emitter 512 and the drop-off detector 518 are disposed between the first and second surface type detectors 514 and 516, wherein the drop-off detector 518 is disposed between the second surface type detector 516 and the emitter 512. In other words, the second and third receptacles 506 and 508 are disposed between the first and fourth receptacles 504 and 510, wherein the third receptacle 508 is disposed between the second receptacle 506 and the fourth receptacle 510. In some instances, a midpoint of the emitter 512 and the drop-off detector 518 may be vertically spaced apart from a midpoint of the first and second surface type detectors 514 and 516. In some instances, the first, second, third, and/or fourth receptacles 504, 506, 508, and/or 510 may be configured to shape and/or direct light emitted therefrom or received therein.

The emitter 512 is oriented within the second receptacle 506 such that an emission axis 520 of the emitter 512 extends in a direction of a surface to be cleaned 521. As such, light emitted from the emitter 512 travels in a direction along the emission axis 520 and is incident on the surface to be cleaned 521. The emitter 512 can be oriented within the second receptacle 506 using second receptacle protrusions 522. For example, the second receptacle protrusions 522 may be configured to center the emitter 512 within the second receptacle 506. In some instances, the second receptacle protrusions 522 may form a press-fit with the emitter 512.

At least a portion of the light incident on the surface to be cleaned 521 is reflected along a first reflection axis 524 and a second reflection axis 526 and at least a portion of the incident light is reflected diffusely. The first reflection axis 524 extends from the surface to be cleaned and intersects the second surface type detector 516. The second surface type detector 516 is oriented within the fourth receptacle 510 such that the first reflection axis 524 intersects the second surface type detector 516. The second surface type detector 516 may be oriented within the fourth receptacle 510 using two sets of fourth receptacle protrusions 528. For example, the fourth receptacle protrusions 528 may be configured to center the second surface type detector 516 within the fourth receptacle 510. In some instances, one or more sets of the fourth receptacle protrusions 528 may form a press-fit with the second surface type detector 516.

The second reflection axis 526 extends from the surface to be cleaned 521 and intersects with the drop-off detector 518. The drop-off detector 518 is oriented within the third receptacle 508 using third receptacle protrusions 530. For example, the third receptacle protrusions 530 may be configured to center the drop-off detector 518 within the third receptacle 508. In some instances, the third receptacle protrusions 530 may form a press-fit with the drop-off detector 518.

At least a portion of the diffusely reflected light may be incident on the first surface type detector 514. The first surface type detector 514 is oriented within the first receptacle 504 such that at least a portion of the diffusely reflected light is incident thereon. The first surface type detector 514 may be oriented within the first receptacle 504 using two sets of first receptacle protrusions 532. For example, the first receptacle protrusions 532 may be configured to center the first surface type detector 514 within the first receptacle 504. In some instances, one or more sets of the first receptacle protrusions 532 may form a press-fit with the first surface type detector 514.

As shown, a divider 534 may extend from the housing 502 and may be positioned between the emitter 512 and the drop-off detector 518. The divider 534 may be configured to prevent interference between the emitter 512 and the drop-off detector 518 caused by emitted but not yet reflected light.

A cover 536 may be coupled to the housing 502 and extend over (e.g., enclose) one or more of (e.g., each of) the receptacles 504, 506, 508, and/or 510. As such, the cover 536 is configured to be transparent to light (e.g., transparent at least to light having wavelengths corresponding to the light emitted by the emitter 512). The cover 536 may mitigate or prevent an ingress of debris into the receptacles 504, 506, 508, and/or 510 over which the cover 536 extends. In some instances, the cover 536 may include one or more light focusing elements (e.g., as discussed in FIG. 6) to focus light incident thereon.

Figure 6:
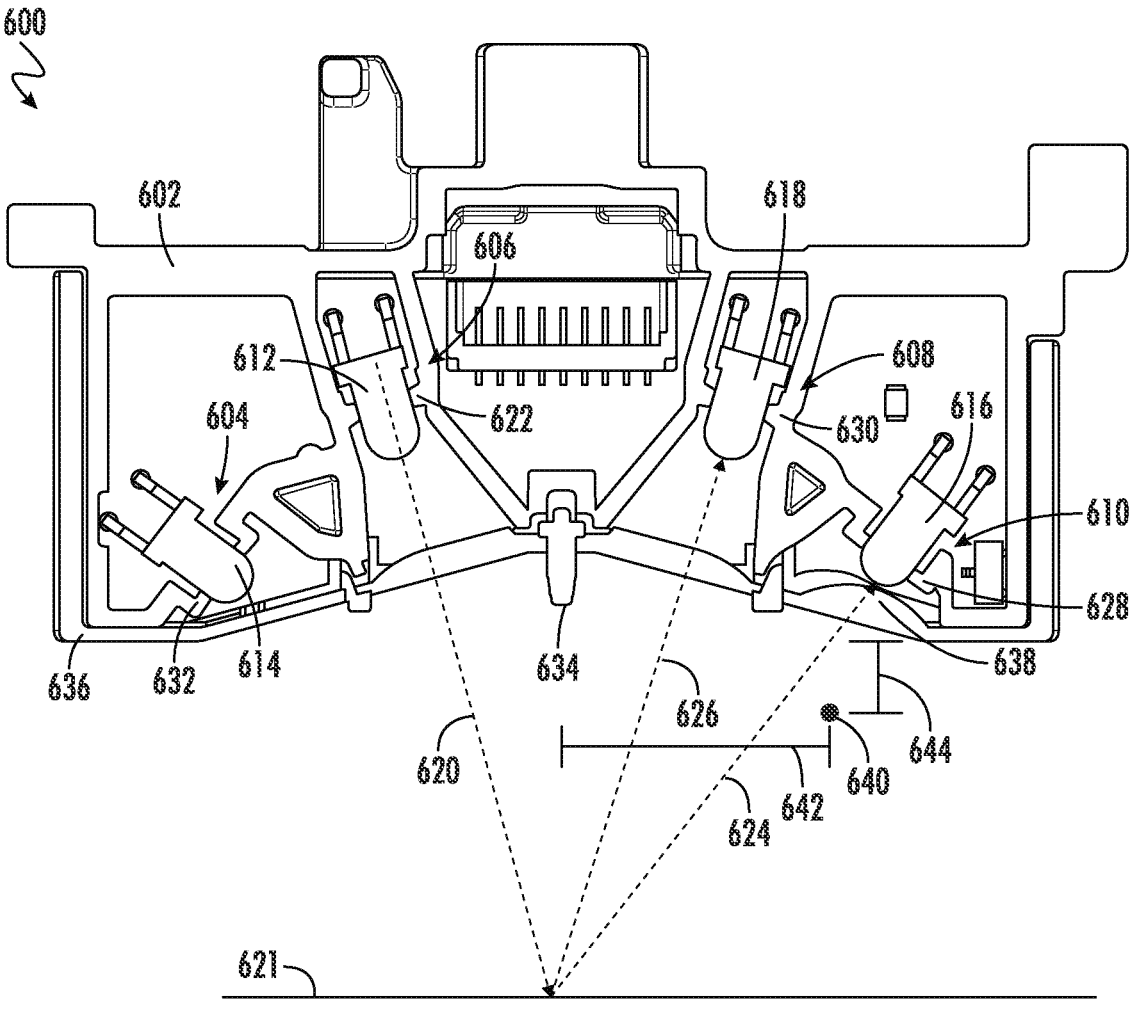
FIG. 6 is a cross-sectional view of an example of a combination surface type sensor, consistent with embodiments of the present disclosure.

FIG. 6 shows a cross-sectional view of a combination surface type sensor 600, which may be an example of the surface type sensor 416 of FIG. 4. As shown, the combination surface type sensor 600 includes a housing 602 having (e.g., defining) a first, second, third, and fourth receptacle 604, 606, 608, and 610, an emitter 612 (e.g., a light emitting diode) disposed within the second receptacle 606, a first surface type detector (e.g., a diffuse light detector) 614 disposed within the first receptacle 604, a second surface type detector (e.g., a specular light detector) 616 disposed within the fourth receptacle 610, and a drop-off detector 618 disposed within the third receptacle 608. As also shown, the emitter 612 and the drop-off detector 618 are disposed between the first and second surface type detectors 614 and 616, wherein the drop-off detector 618 is disposed between the second surface type detector 616 and the emitter 612. In other words, the second and third receptacles 606 and 608 are disposed between the first and fourth receptacles 604 and 610, wherein the third receptacle 608 is disposed between the second receptacle 606 and the fourth receptacle 610. In some instances, a midpoint of the emitter 612 and the drop-off detector 618 may be vertically spaced apart from a midpoint of the first and second surface type detectors 614 and 616. In some instances, the first, second, third, and/or fourth receptacles 604, 606, 608, and/or 610 may be configured to shape and/or direct light emitted therefrom or received therein.

The emitter 612 is oriented within the second receptacle 606 such that an emission axis 620 of the emitter 612 extends in a direction of a surface to be cleaned 621. As such, light emitted from the emitter 612 travels in a direction along the emission axis 620 and is incident on the surface to be cleaned 621. The emitter 612 can be oriented within the second receptacle 606 using second receptacle protrusions 622. For example, the second receptacle protrusions 622 may be configured to center the emitter 612 within the second receptacle 606. In some instances, the second receptacle protrusions 622 may form a press-fit with the emitter 612.

At least a portion of the light incident on the surface to be cleaned 621 is reflected along a first reflection axis 624 and a second reflection axis 626 and at least a portion of the incident light is reflected diffusely. The first reflection axis 624 extends from the surface to be cleaned 621 and intersects the second surface type detector 616. The second surface type detector 616 is oriented within the fourth receptacle 610 such that the first reflection axis 624 intersects the second surface type detector 616. The second surface type detector 616 may be oriented within the fourth receptacle 610 using fourth receptacle protrusions 628. For example, the fourth receptacle protrusions 628 may be configured to center the second surface type detector 616 within the fourth receptacle 610. In some instances, the fourth receptacle protrusions 628 may form a press-fit with the second surface type detector 616.

The second reflection axis 626 extends from the surface to be cleaned 621 and intersects with the drop-off detector 618. The drop-off detector 618 is oriented within the third receptacle 608 using third receptacle protrusions 630. For example, the third receptacle protrusions 630 may be configured to center the drop-off detector 618 within the third receptacle 608. In some instances, the third receptacle protrusions 630 may form a press-fit with the drop-off detector 618.

At least a portion of the diffusely reflected light may be incident on the first surface type detector 614. The first surface type detector 614 is oriented within the first receptacle 604 such that at least a portion of the diffusely reflected light is incident thereon. The first surface type detector 614 may be oriented within the first receptacle 604 using first receptacle protrusions 632. For example, the first receptacle protrusions 632 may be configured to center the first surface type detector 614 within the first receptacle 604. In some instances, the first receptacle protrusions 632 may form a press-fit with the first surface type detector 614.

As shown, a divider 634 may extend from the housing 602 and may be positioned between the emitter 612 and the drop-off detector 618. The divider 634 may be configured to prevent interference between the emitter 612 and the drop-off detector 618 caused by emitted but not yet reflected light.

A cover 636 may be coupled to the housing 602 and extend over (e.g., enclose) one or more of (e.g., each of) the receptacles 604, 606, 608, and/or 610. As such, the cover 636 is configured to be transparent to light (e.g., transparent at least to light having wavelengths corresponding to the light emitted by the emitter 612). The cover 636 may mitigate or prevent an ingress of debris into the receptacles 604, 606, 608, and/or 610 over which the cover 636 extends. In some instances, the cover 636 may include one or more light focusing elements 638 to focus light incident thereon. For example, and as shown, at least one light focusing element 638 may be configured to focus light incident on the cover 636 on to the second surface type detector 616. In other words, the light focusing element 638 corresponds to the fourth receptacle 610. In this example, the at least one light focusing element 638 may be a planoconvex lens, wherein the convex portion of the lens extends towards the second surface type detector 616 (such a configuration prevents the convex portion of the lens from coming into contact with the surface to be cleaned 621 and/or objects on the surface to be cleaned 621). Focusing of light on the second surface type detector 616 may increase a strength of a signal generated by the second surface type detector 616, allowing for a change in surface type to be more readily detected. While the cover 636 is shown as only including a light focusing element 638 that corresponds to the second surface type detector 616. Other configurations are possible. For example, one or more of the first surface type detector 614, the second surface type detector 616, the emitter 612, and/or the drop-off detector 618 may have a respective focusing element 638 that corresponds thereto.

When the light focusing element 638 is a planoconvex lens that corresponds to the second surface type detector 616, an origin 640 of a radius of curvature corresponding to the planoconvex lens may be horizontally spaced apart from the divider 634 by a horizontal separation distance 642 and may be vertically spaced apart from the housing 602 by a vertical separation distance 644. For example, the horizontal separation distance 642 may measure 13.45 millimeters (mm) and the vertical separation distance 644 may measure 2.3 mm.

Figure 7:
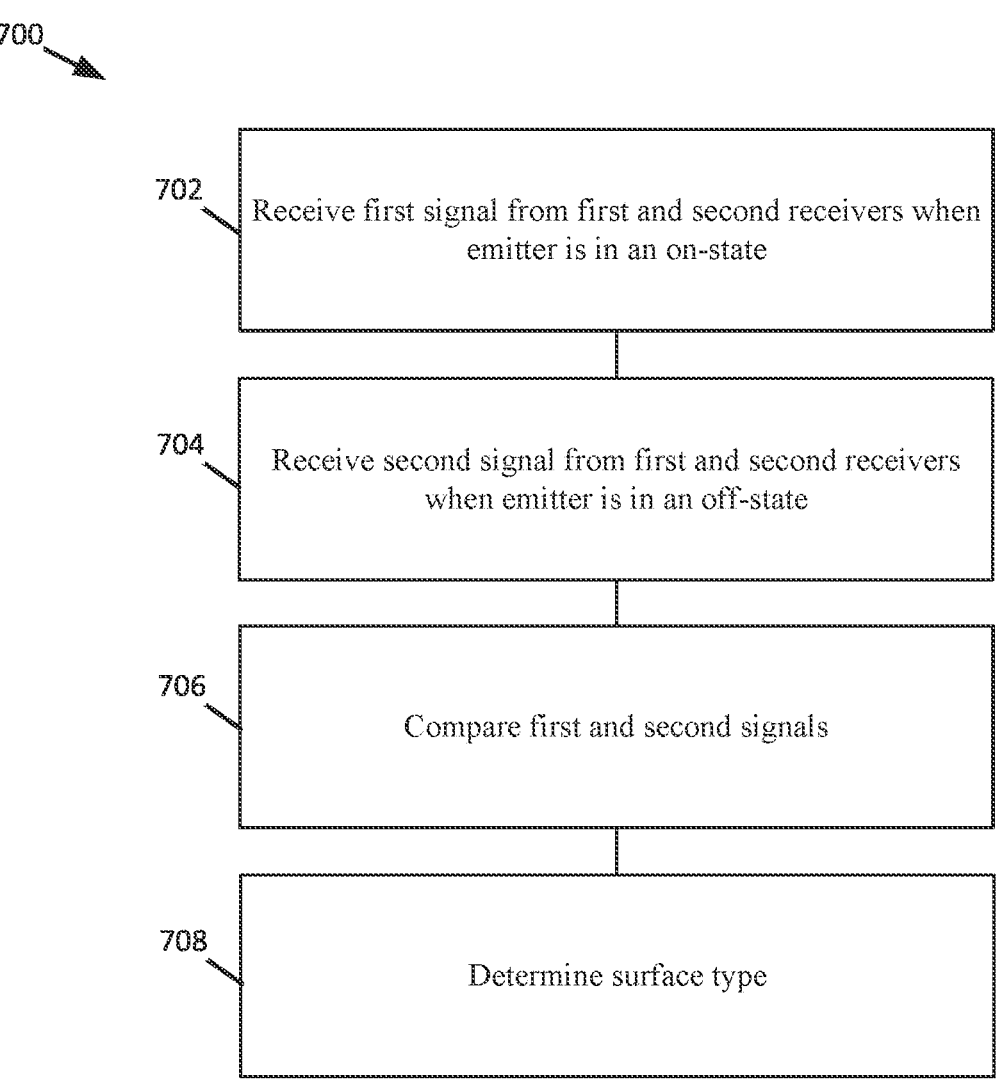
FIG. 7 is a flow chart of an example of a method of detecting a surface type, consistent with embodiments of the present disclosure.

FIG. 7 shows a flow chart of an example method 700 for detecting a surface type. The method may be carried out by any combination of software, firmware, and/or hardware. For example, a controller (e.g., the controller 130 of FIG. 1) may include one or more processors configured to execute one or more instructions stored on one or more memories (e.g., one or more non-transitory memories), wherein the one or more instructions correspond to the method 700.

As shown, the method 700 may include a step (or operation) 702. The step 702 includes receiving (e.g., by a controller such as the controller 130 of FIG. 1) a first signal from each of a first and a second surface type detector (e.g., the surface type detectors 204, 206, 304, or 306 of FIGS. 2 and 3) of a surface type sensor (e.g., the surface type sensor 114 of FIG. 1). The first signal for each of the first and second surface type detectors is generated when an emitter (e.g., the emitter 202 or 302 of FIGS. 2 and 3) is in an on-state. As such, the step 702 may include transitioning the emitter to the on-state.

The method 700 may also include a step 704. The step 704 includes receiving a second signal from each of the first and second surface type detectors. The second signal for each of the first and second surface type detectors is generated when the emitter is in an off-state. As such, the step 704 may include transitioning the emitter to the off-state.

The method 700 may also include a step 706. The step 706 includes comparing the first and second signals to obtain a comparison result. For example, the step 706 may include comparing the first signal from the first surface type detector to the second signal from the first surface type detector to generate a first comparison result and comparing the first signal from the second surface type detector to the second signal from the second surface type detector to generate a second comparison result. The method 700 may also include a step 708. The step 708 includes determining a surface type based, at least in part, on the comparison result.

FIG. 8 shows an example method 800 corresponding to the step 706 of FIG. 7. As shown, the method 800 may include a step 802. The step 802 includes determining a first comparison result. Determining the first comparison result may include determining a difference between the first signal received from the first surface type detector and the second signal received from the first surface type detector. For example, a magnitude of the second signal may be subtracted from a magnitude of the first signal. In other words, the step 802 may, in some instances, generally be described as subtracting a signal generated during an off-state of the emitter from a signal generated during an on-state of the emitter. As such, the resulting difference may generally be referred to as a first detector difference.

The method 800 may also include a step 804. The step 804 includes determining a second comparison result. Determining the second comparison result may include determining a difference between the first signal received from the second surface type detector and the second signal received from the second surface type detector. For example, a magnitude of the second signal may be subtracted from a magnitude of the first signal. In other words, the step 804 may, in some instances, generally be described as subtracting a signal generated during an off-state of the emitter from a signal generated during an on-state of the emitter. As such, the resulting difference may generally be referred to as a second detector difference.

FIG. 9 shows an example method 900 corresponding to the step 708 of FIG. 7. As shown, the method 900 may include a step 902. The step 902 includes determining a difference between the first and second comparison results. For example, a difference between the first detector difference and the second detector difference may be determined (the first and second detector differences may be determined using, for example, the method 800 of FIG. 8). In this example, when the first surface type detector is configured to detect diffuse light and the second surface type detector is configured to detect specular light, the first detector difference may be subtracted from the second detector difference and the determined difference may generally be referred to as the specular-diffuse difference.

The method 900 may also include a step 904. The step 904 includes comparing the determined difference to a threshold to determine a surface type. For example, when the specular-diffuse difference is determined, the specular-diffuse difference may be compared to a threshold, wherein if the specular-diffuse difference is greater than the threshold the surface type may be determined to be a soft surface (e.g., carpet) and if the difference is less than the threshold the surface type may be determined to be a hard surface (e.g., tile).

In some instances, the threshold may be a variable threshold, wherein the threshold changes, based, at least in part, on a signal generated by one or more of the first and second detectors. For example, the threshold may vary based, at least in part, on the signal generated by the detector configured to detect specular light. In this example, the threshold may vary in response to a magnitude of the signal exceeding and/or falling below a predetermined value.

Figure 10:
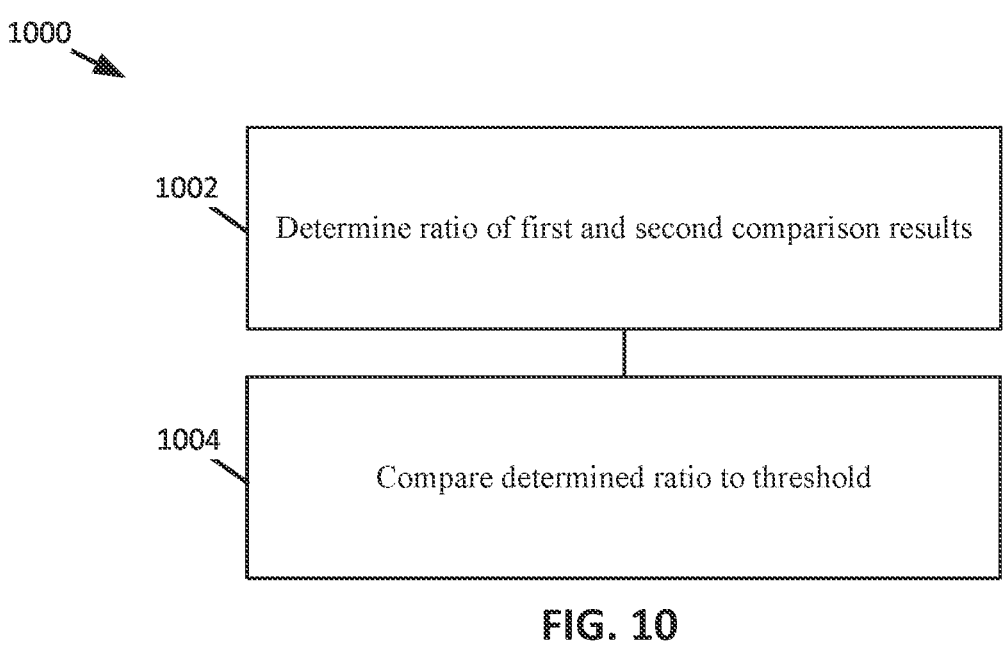
FIG. 10 is a flow chart of an example of a method corresponding to a step of the method of detecting a surface type of FIG. 7, consistent with embodiments of the present disclosure.

FIG. 10 shows an example method 1000 corresponding to the step 708 of FIG. 7. As shown, the method 1000 may include a step 1002. The step 1002 includes determining a ratio of the first and second comparison results. For example, a ratio of the first detector difference and the second detector difference may be determined (the first and second detector differences may be determined using, for example, the method 800 of FIG. 8). In this example, when the first surface type detector is configured to detect diffuse light and the second surface type detector is configured to detect specular light, the ratio may be calculated by dividing the second detector difference by the first detector difference and the ratio may be generally referred to as the specular-diffuse ratio.

The method 1000 may also include a step 1004. The step 1004 includes comparing the determined ratio to a threshold. For example, when the specular-diffuse ratio is determined, the specular-diffuse ratio may be compared to a threshold, wherein if the specular-diffuse ratio is greater than the threshold the surface type may be determined to be a soft surface (e.g., carpet) and if the specular-diffuse ratio is less than the threshold the surface type may be determined to be a hard surface (e.g., tile). The threshold may measure, for example, in a range of 0.5 to 3.5. By way of further example, the threshold may measure in a range of 2.0 and 3.0. By way of still further example, the threshold may measure in a range of 0.75 and 1.25. When a focusing element is used to focus the light on the specular surface type detector, the threshold may be greater.

Figure 11:
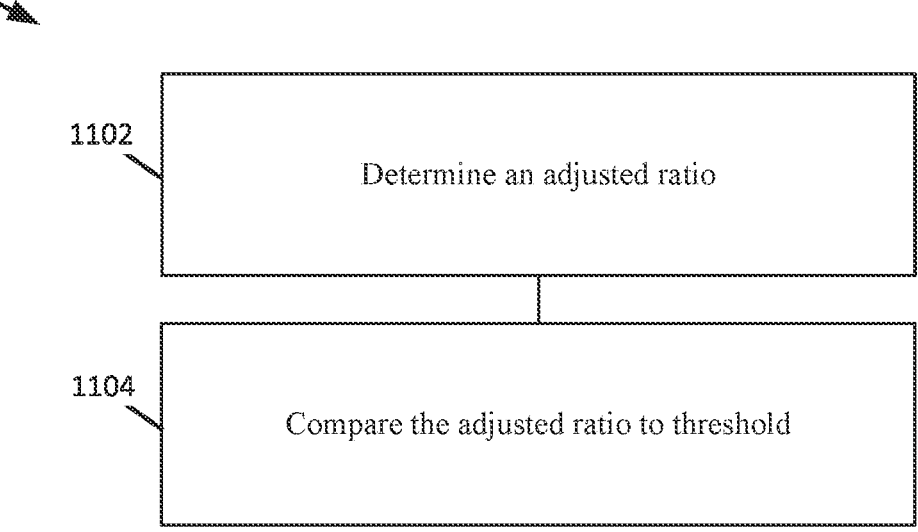
FIG. 11 is a flow chart of an example of a method corresponding to a step of the method of detecting a surface type of FIG. 7, consistent with embodiments of the present disclosure.

FIG. 11 shows an example method 1100 corresponding to the step 708 of FIG. 7. As shown, the method 1100 may include a step 1102. The step 1102 includes determining a ratio of the first and second comparison results, subtracting the ratio from a value of 1 to obtain a modified ratio, and multiplying the modified ratio by a weight factor (e.g., the weight factor may be equal to 10, 100, 1,000, 10,000, or any other weight factor) to obtain an adjusted ratio. For example, the ratio may be a ratio of the first detector difference and the second detector difference (the first and second detector differences may be determined using, for example, the method 800 of FIG. 8). In this example, when the first surface type detector is configured to detect diffuse light and the second surface type detector is configured to detect specular light, the ratio may be calculated by dividing the second detector difference by the first detector difference and the ratio may be generally referred to as the specular-diffuse ratio. The specular-diffuse ratio may be subtracted from a value of 1 to obtain a specular-diffuse modified ratio and the specular-diffuse modified ratio may be multiplied by 1,000 to obtain a specular-diffuse adjusted ratio.

The method 1100 may also include a step 1104. The step 1104 includes comparing the adjusted ratio to a threshold. For example, when the specular-diffuse adjusted ratio is determined, the specular-diffuse adjusted ratio may be compared to a threshold, wherein if the specular-diffuse adjusted ratio is greater than the threshold the surface type may be determined to be a soft surface (e.g., carpet) and if the adjusted ratio is less than the threshold the surface type may be determined to be a hard surface (e.g., tile).

An example of a combination surface type sensor, consistent with the present disclosure, may include a housing including a first receptacle, a second receptacle, a third receptacle, and a fourth receptacle, a first surface type detector disposed within the first receptacle, a second surface type detector disposed within the fourth receptacle, an emitter disposed within the second receptacle, and a drop-off detector disposed within the third receptacle.

In some instances, the second and third receptacles may be disposed between the first and fourth receptacle and the third receptacle may be disposed between the second and fourth receptacle. In some instances, the combination surface type sensor may further include a cover extending over each of the first, second, third, and fourth receptacles. In some instances, the cover may include a light focusing element. In some instances, the light focusing element may correspond to the fourth receptacle. In some instances, the light focusing element may be a planoconvex lens. In some instances, the first surface type detector may be configured to detect diffuse light and the second surface type detector may be configured to detect specular light.

An example of a robotic cleaner, consistent with the present disclosure, may include a body, a primary controller, a secondary controller communicatively coupled to the primary controller, and a combination surface type sensor coupled to the body. The combination surface type sensor may include a housing including a first receptacle, a second receptacle, a third receptacle, and a fourth receptacle, a first surface type detector disposed within the first receptacle and communicatively coupled to the primary controller, a second surface type detector disposed within the fourth receptacle and communicatively coupled to the primary controller, an emitter disposed within the second receptacle and communicatively coupled to the secondary controller, and a drop-off detector disposed within the third receptacle and communicatively coupled to the secondary controller.

In some instances, the second and third receptacles may be disposed between the first and fourth receptacle and the third receptacle may be disposed between the second and fourth receptacle. In some instances, the combination surface type sensor may further include a cover extending over each of the first, second, third, and fourth receptacles. In some instances, the cover may include a light focusing element. In some instances, the light focusing element may correspond to the fourth receptacle. In some instances, the light focusing element may be a planoconvex lens. In some instances, the first surface type detector may be configured to detect diffuse light and the second surface type detector may be configured to detect specular light.

Another example of a robotic cleaner, consistent with the present disclosure, may include a combination surface type sensor and a controller configured to carry out one or more operations. The combination surface type sensor may include a first surface type detector, a second surface type detector, a drop-off detector, and an emitter. The one or more operations may include receiving a first signal from the first surface type detector, receiving a first signal from the second surface type detector, receiving a second signal from the first surface type detector, receiving a second signal from the second surface type detector, comparing the first and second signals from each of the first and second surface type detectors, and determining based, at least in part, on the comparison a surface type.

In some instances, the comparison of the first and second signals from each of the first and second surface type detectors may include comparing the first signal from the first surface type detector to the second signal from the first surface type detector to generate a first comparison result and comparing the first signal from the second surface type detector to the second signal from the second surface type detector to generate a second comparison result. In some instances, determining a surface type may include comparing a difference between the first comparison result and the second comparison result to a threshold. In some instances, the threshold may be variable. In some instances, determining a surface type may include comparing a ratio of the first comparison result and the second comparison result to a threshold. In some instances, the ratio may be subtracted from a value of one to obtain to a modified ratio and the modified ratio is multiplied by a weight factor.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A combination surface type sensor comprising:
   a housing including a first receptacle, a second receptacle, a third receptacle, and a fourth receptacle;
   a first surface type detector disposed within the first receptacle;
   a second surface type detector disposed within the fourth receptacle;
   an emitter disposed within the second receptacle;
   a drop-off detector disposed within the third receptacle; and
   a cover extending over each of the first, second, third, and fourth receptacles, the cover including a lens that corresponds to the fourth receptacle.

2. The combination surface type sensor of claim 1, wherein the second and third receptacles are disposed between the first and fourth receptacle and the third receptacle is disposed between the second and fourth receptacle.

3. The combination surface type sensor of claim 1, wherein the lens is a planoconvex lens.

4. The combination surface type sensor of claim 1, wherein the first surface type detector is configured to detect diffuse light and the second surface type detector is configured to detect specular light.

5. A robotic cleaner comprising:

a body;

a primary controller coupled to the body and being configured to cause the robotic cleaner to carry out at least one cleaning behavior;

a secondary controller coupled to the body and communicatively coupled to the primary controller, the secondary controller being configured to cause the robotic cleaner to carry out at least one hazard avoidance behavior; and a combination surface type sensor coupled to the body, the combination surface type sensor including:

a housing including a first receptacle, a second receptacle, a third receptacle, and a fourth receptacle;

a first surface type detector disposed within the first receptacle and communicatively coupled to the primary controller;

a second surface type detector disposed within the fourth receptacle and communicatively coupled to the primary controller;

an emitter disposed within the second receptacle and communicatively coupled to the secondary controller;

a drop-off detector disposed within the third receptacle and communicatively coupled to the secondary controller; and a cover extending over each of the first, second, third, and fourth receptacles, the cover includes a lens, and the lens corresponds to the fourth receptacle.

6. The robotic cleaner of claim 5, wherein the second and third receptacles are disposed between the first and fourth receptacle and the third receptacle is disposed between the second and fourth receptacle.

7. The robotic cleaner of claim 5, wherein the lens is a planoconvex lens.

8. The robotic cleaner of claim 5, wherein the first surface type detector is configured to detect diffuse light and the second surface type detector is configured to detect specular light.

* * * * *